United States Patent
Lee

(10) Patent No.: US 9,297,890 B2
(45) Date of Patent: Mar. 29, 2016

(54) APPARATUS AND METHOD FOR GENERATING DOPPLER IMAGE

(75) Inventor: Woo-youl Lee, Gangwon-do (KR)

(73) Assignee: Samsung Medison Co., Ltd., Gangwon-Do (KR)

( * ) Notice: Subject to any disclaimer, the term of this patent is extended or adjusted under 35 U.S.C. 154(b) by 0 days.

(21) Appl. No.: 13/416,554

(22) Filed: Mar. 9, 2012

(65) Prior Publication Data

US 2012/0232399 A1 Sep. 13, 2012

(30) Foreign Application Priority Data

Mar. 11, 2011 (KR) .................. 10-2011-0021905
Mar. 7, 2012 (KR) .................. 10-2012-0023621

(51) Int. Cl.
*A61B 8/00* (2006.01)
*G01S 7/52* (2006.01)
*G01S 15/89* (2006.01)

(52) U.S. Cl.
CPC ......... *G01S 7/52046* (2013.01); *G01S 15/8979* (2013.01)

(58) Field of Classification Search
USPC .................. 600/453–454, 407, 437
See application file for complete search history.

(56) References Cited

U.S. PATENT DOCUMENTS

| | | | |
|---|---|---|---|
| 4,182,173 A * | 1/1980 | Papadofrangakis et al. | 73/861.27 |
| 5,197,477 A * | 3/1993 | Peterson et al. | 600/454 |
| 5,345,187 A * | 9/1994 | McGuire | 329/302 |
| 5,562,098 A * | 10/1996 | Lerner | 600/454 |
| 5,879,303 A | 3/1999 | Averkiou et al. | |
| 6,039,690 A * | 3/2000 | Holley et al. | 600/440 |
| 6,050,942 A | 4/2000 | Rust et al. | |
| 6,132,374 A | 10/2000 | Hossack et al. | |
| 6,139,501 A | 10/2000 | Roundhill et al. | |
| 6,364,836 B1 * | 4/2002 | Fukukita et al. | 600/443 |
| 6,390,980 B1 | 5/2002 | Peterson et al. | |
| 6,454,714 B1 | 9/2002 | Ng et al. | |
| 6,458,083 B1 | 10/2002 | Jago et al. | |
| 2010/0231439 A1 * | 9/2010 | Bachmann | 342/169 |

FOREIGN PATENT DOCUMENTS

| | | |
|---|---|---|
| EP | 1118875 A2 | 7/2001 |
| JP | 2011-101715 A | 5/2011 |
| WO | 00/75689 A1 | 12/2000 |

OTHER PUBLICATIONS

Ranganathan et al., "Direct Sampled I/Q Beamforming for Compact and Very Low-Cost Ultrasound Imaging," IEEE Transactions on Ultrasonics, Ferroelectrics and Frequency Controls, vol. 51, No. 9, Sep. 2004, pp. 1082-1094.

(Continued)

*Primary Examiner* — Joel F Brutus
(74) *Attorney, Agent, or Firm* — McDermott Will & Emery LLP

(57) ABSTRACT

A method for generating a Doppler image by using a ultrasound system, the method including: transmitting a ultrasound signal to an object and receiving a response signal reflected from the object; converting the response signal into a plurality of in-phase/quadrature-phase (I/Q) signals having different frequencies; and generating a Doppler image of the object based on information about a speed of the object obtained from the plurality of I/Q signals.

13 Claims, 4 Drawing Sheets

(56) References Cited

OTHER PUBLICATIONS

Extended European Search Report issued in European Application No. 12158722.4 dated Jul. 1, 2014.

Notice of Allowance issued in corresponding Korean Patent Application No. 10-2014-0034819, mailed on Jul. 30, 2015; with English translation.

* cited by examiner

APPARATUS AND METHOD FOR GENERATING DOPPLER IMAGE

CROSS-REFERENCE TO RELATED PATENT APPLICATION

This application claims the benefit of Korean Patent Application Nos. 10-2011-0021905, filed on Mar. 11, 2011, 10-2012-0023621, filed on Mar. 7, 2012, in the Korean Intellectual Property Office, the disclosures of which are incorporated herein in their entirety by reference.

BACKGROUND OF THE INVENTION

1. Field of the Invention

The present invention relates to an apparatus and method for generating a Doppler image, and more particularly, an apparatus and method for generating a Doppler image by using a plurality of in-phase/quadrature-phase (I/Q) signals.

2. Description of the Related Art

Ultrasound systems are essential equipment for observing an inner structure of an organic object. Ultrasound systems are non-invasive inspection devices that show structural details of the body, an inner tissue, and the flow of a fluid.

Ultrasound systems transmit a ultrasound signal to an object through the body, receive a response signal reflected from the object, and images the inner structure of the body. In addition, ultrasound systems may measure speed and/or direction of the object by using a Doppler effect. In detail, ultrasound systems may compare a frequency of the ultrasound signal transmitted to the object with a frequency of the response signal reflected from the object, may measure a degree of a change in frequency, and may measure speed and/or direction of the object by using the measurement results. A ultrasound image that indicates speed and/or direction of the object is referred to as a Doppler image, and an inspector may check information about movement of blood steam and an organ, such as the heart, or the like, from the Doppler image.

SUMMARY OF THE INVENTION

The present invention provides an apparatus and method for generating a Doppler image, whereby a signal to noise ratio (SNR) of a Doppler signal is improved using a plurality of in-phase/quadrature-phase (I/Q) signals.

The present invention also provides an apparatus and method for generating a Doppler image, whereby the quality of a Doppler image is improved.

According to an aspect of the present invention, there is provided a method for generating a Doppler image by using a ultrasound system, the method including: transmitting a ultrasound signal to an object and receiving a response signal reflected from the object; converting the response signal into a plurality of in-phase/quadrature-phase (I/Q) signals having different frequencies; and generating a Doppler image of the object based on information about a speed of the object obtained from the plurality of I/Q signals.

The converting the response signal into the plurality of I/Q signals may include: receiving and focusing the response signal; and converting the received and focused response signal into the plurality of I/Q signals.

The generating the Doppler image of the object may include: applying time delay to a part or a whole of the plurality of I/Q signals; and generating the Doppler image of the object based on the information about the speed of the object obtained from the plurality of I/Q signals, of which a part or a whole time delay is applied to.

The method may further include determining the different frequencies of the plurality of I/Q signals within a band width of the ultrasound system based on a frequency of the ultrasound signal.

The Doppler image may include a color Doppler image or Doppler spectrum.

The converting the response signal into the plurality of I/Q signals may include mixing a plurality of carrier signals having different frequencies with the response signal.

According to another aspect of the present invention, there is provided an apparatus for generating a Doppler image, including: a probe for transmitting a ultrasound signal to an object and for receiving a response signal reflected from the object; an in-phase/quadrature-phase (I/Q) demodulation unit for converting the response signal into a plurality of I/Q signals having different frequencies; and an image processing unit for generating a Doppler image of the object based on information about a speed of the object obtained from the plurality of I/Q signals.

The apparatus may further include a first beam forming unit for receiving and focusing the response signal, wherein the I/Q demodulation unit converts the received and focused response signal into the plurality of I/Q signals.

The apparatus may further include a second beam forming unit for applying time delay to a part or a whole of the plurality of I/Q signals, wherein the image processing unit generates the Doppler image of the object based on the information about the speed of the object obtained from the plurality of I/Q signals, of which a part or a whole time delay is applied to.

The apparatus may further include a control unit for determining the different frequencies of the plurality of I/Q signals within a band width of the ultrasound system based on a frequency of the ultrasound signal.

The Doppler image may include a color Doppler image or Doppler spectrum.

The I/Q demodulation unit may include a plurality of mixers for mixing a plurality of carrier signals having predetermined frequencies with the response signal.

According to another aspect of the present invention, there is provided a computer readable recording medium having recorded thereon a program for executing the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
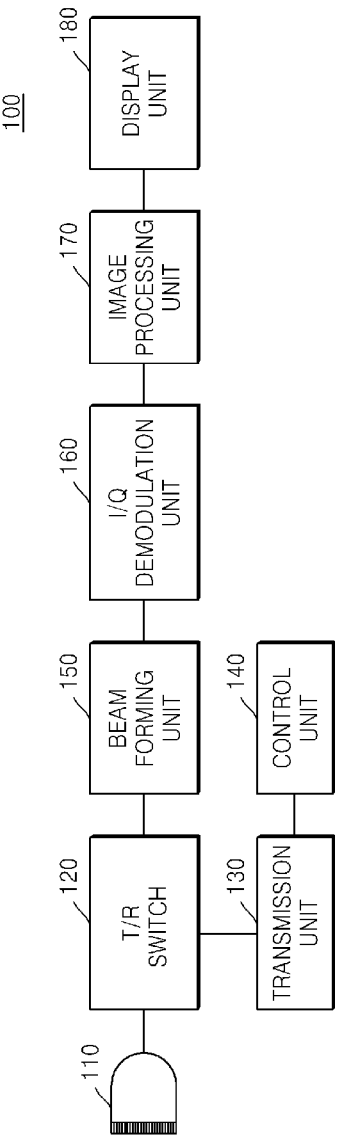
FIG. 1A is a block diagram of a structure of a ultrasound system according to the related art.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements.

The term 'unit' used herein refers to a software element, or a hardware element, such as FPGA or ASIC, wherein a 'unit' performs a certain function. However, the term 'unit' is not limited to software or hardware. A 'unit' may be configured on an addressable storage medium, or configured to reproduce one or more processors. Thus, the term 'unit' includes elements, such as software elements, object-oriented software elements, class elements, and task elements, processes, functions, properties, procedures, sub-routines, segments of a program code, drivers, firmware, a micro-code, tables, arrays, and variables. Elements and functions of 'unit's may be combined with a smaller number of elements and 'unit's or may be subdivided into additional elements and 'unit's.

In the attached drawings, 'arrow' represents the flow of a signal.

FIG. 1A is a block diagram of a structure of a ultrasound system 100 according to the related art.

Referring to FIG. 1A, the ultrasound system 100 according to the related art includes a probe 110, a transmit/receive (T/R) switch 120, a transmission unit 130, a control unit 140, a beam forming unit 150, an in-phase/quadrature-phase (I/Q) demodulation unit 160, an image processing unit 170, and a display unit 180.

The probe 110 includes a plurality of elements including piezoelectric devices. The probe 110 transmits a ultrasound signal to an object and receives a response signal reflected from the object. There may be a plurality of response signals.

The 'object' used herein refers to an embryo, all kinds of organs of the body or a particular part of the body from which a ultrasound image is to be obtained. The probe 110 converts a response signal reflected from the object into an electric signal (RF reception signal).

The T/R switch 120 controls the ultrasound system 100 to transmit the ultrasound signal from the transmission unit 130 to the probe 110 and to transmit the response signal from the probe 110 to the beam forming unit 150 under control of the control unit 140.

The transmission unit 130 generates a ultrasound signal based on a transmission control signal transmitted from the control unit 140. In detail, the transmission unit 130 may increase or decrease a beam width of the ultrasound signal by analyzing the transmission control signal transmitted from the control unit 140.

The beam forming unit 150 focuses a plurality of received response signals and converts the plurality of focused response signals into one signal. Since a distance between each of the plurality of elements included in the probe 110 and the object differs, the response signals reflected from the object are not received by the probe 110 at the same time. Thus, the beam forming unit 150 applies time delay to a part or the whole of the plurality of received response signals, and converts the plurality of received response signals into one response signal by adding the plurality of received response signals.

The I/Q demodulation unit 160 detects in-phase (I) and quadrature-phase (Q) signals in the form of a complex number based on the response signal outputted from the beam forming unit 150.

The image processing unit 170 obtains information about a speed of the object by using the I signal and the Q signal outputted from the I/Q demodulation unit 160 and generates a Doppler image that indicates a speed or direction of the object based on the obtained information about the speed of the object. The display unit 180 displays the Doppler image generated by the image processing unit 170 to a user.

Figure 1B:
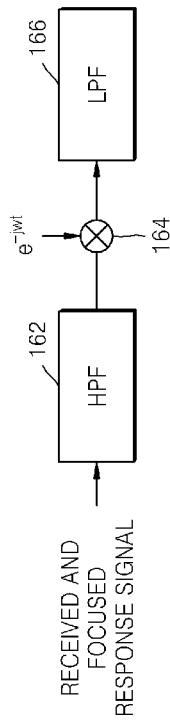
FIG. 1B is a block diagram of a structure of an in-phase/quadrature-phase (I/Q) demodulation unit of the ultrasound system illustrated in FIG. 1A.

FIG. 1B is a block diagram of a structure of an in-phase/quadrature-phase (I/Q) demodulation unit 160 of the ultrasound system 100 illustrated in FIG. 1A. The I/Q demodulation unit 160 includes a high pass filter (HPF) 162, a mixer 164, and a low pass filter (LPF) 166.

The response signal outputted from the beam forming unit 150 are transmitted to the HPF 162, and the HPF 162 removes direct current (DC) components from an RF signal.

The mixer 164 mixes a carrier signal $e^{-jwt}$ with a signal transmitted from the HPF 162. w represents a frequency of the carrier signal $e^{-jwt}$. Since, according to the Euler's formular, $e^{-jwt}$ is $cos(wt)+sin(wt)$, a carrier signal $cos(wt)$ and a carrier signal $sin(wt)$ are mixed with the signal transmitted from the HPF 162. Thereafter, a response signal obtained by mixing the carrier signal $cos(wt)$ and the carrier signal $sin(wt)$ passes through the LPF 166. Thus, an I signal including in-phase components, and a Q signal including quadrature-phase components are generated.

The I/Q demodulation unit 160 of the ultrasound system 100 according to the related art converts the response signal outputted from the beam forming unit 150 into a pair of I/Q signals, and the image processing unit 170 obtains the information about the speed of the object by using the pair of I/Q signals. Thus, when an error or noise exists in the I/Q signal, the Doppler image may not be precisely obtained. An apparatus for generating a Doppler image according to an embodiment of the present invention obtains a plurality of I/Q signals and compares the plurality of I/Q signals to generate the Doppler image so that the problem that occurs in the ultrasound system 100 according to the related art may be solved.

Figure 2:
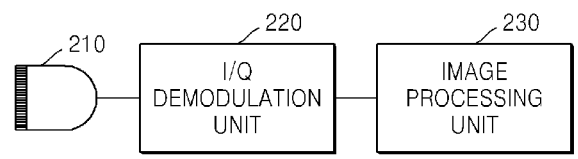
FIG. 2 is a block diagram of a structure of an apparatus for generating a Doppler image according to an embodiment of the present invention.

FIG. 2 is a block diagram of a structure of an apparatus 200 for generating a Doppler image according to an embodiment of the present invention.

Referring to FIG. 2, the apparatus 200 for generating a Doppler image may include a probe 210, and an I/Q demodulation unit 220 or an image processing unit 230.

Although not shown in FIG. 2, the apparatus 200 for generating a Doppler image according to the present embodiment may include the structure of the ultrasound system illustrated in FIG. 1A, according to the related art.

The probe 210 transmits a ultrasound signal to an object and receives a response signal reflected from an object. There may be a plurality of ultrasound signals and a plurality of response signals.

The I/Q demodulation unit 220 converts the response signal into a plurality of I/Q signals having different frequencies.

In the apparatus 200 for generating a Doppler image according to the present embodiment, the I/Q demodulation unit 220 may include a plurality of mixers that mixes a carrier signal having a predetermined frequency with the response signal. The plurality of mixers each mixes carrier signals having different frequencies with the response signal so that a plurality of I/Q signals having different frequencies may be obtained by the I/Q demodulation unit 220.

The image processing unit 230 obtains information about a speed of the object from the plurality of I/Q signals outputted from the I/Q demodulation unit 220. The 'information about the speed' may include information about a speed or direction of the object. It would be obvious to one of ordinary skill in the art that the speed and movement direction of the object are obtained using the response signals or the I/Q signals and thus, detailed descriptions thereof are omitted.

The image processing unit 230 generates a Doppler image of the object based on the information about the speed of the object.

Since the apparatus 200 for generating a Doppler image according to the present embodiment generates the Doppler image by using the plurality of I/Q signals, the Doppler image having higher quality than a Doppler image generated using only one I/Q signal may be generated.

The image processing unit 230 may obtain the information about the speed of the object in consideration of only the I/Q signals other than the I/Q signals including an error or noise from among the plurality of I/Q signals.

The Doppler image generated by the image processing unit 230 may include a color Doppler image or a Doppler spectrum.

The apparatus 200 for generating a Doppler image according to the present embodiment may further include an analog to digital converter (ADC)(not shown) that converts the response signal received by the probe 210 into a digital signal.

Figure 3:
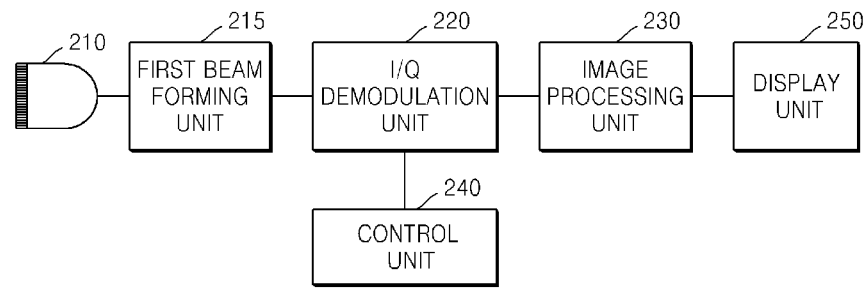
FIG. 3 is a block diagram of a structure of an apparatus for generating a Doppler image according to another embodiment of the present invention.

FIG. 3 is a block diagram of a structure of an apparatus 200 for generating a Doppler image according to another embodiment of the present invention.

Referring to FIG. 3, the apparatus 200 for generating a Doppler image according to the present embodiment may include a probe 210, a first beam forming unit 215, an I/Q demodulation unit 220, an image processing unit 230, a control unit 240 or a display unit 250. The probe 210, the I/Q demodulation unit 220, and the image processing unit 230 are the same as those of FIG. 2 and thus, detailed descriptions thereof are omitted.

The first beam forming unit 215 receives a plurality of response signals from the probe 210 and focuses the plurality of response signals. In detail, the first beam forming unit 215 makes timing of the response signals coincident by applying time delay to a part or the whole of the plurality of response signals, adds the plurality of I/Q signals, of which a part or the whole time delay is applied to, to generate one response signal.

The I/Q demodulation unit 220 converts the one response signal into a plurality of I/Q signals, and the image processing unit 230 generates a Doppler image based on the plurality of I/Q signals.

The display unit 250 displays the Doppler image generated by the image processing unit 230 to a user.

The control unit 240 sets frequencies of a plurality of carrier signals to be mixed with the one response signal. The frequencies of the plurality of carrier signals may be set differently, and the control unit 240 may set the frequencies of the plurality of carrier signals within a range of a band width that may be processed by the apparatus 200 based on a frequency of the ultrasound signal transmitted to the object. In detail, when an intermediate frequency of the ultrasound signal transmitted to the object is $f_0$, the frequencies of the plurality of carrier signals may be set to $f_0+a$, $f_0-a$, $f_0+b$, $f_0-b$, and . . . .

Figure 4:
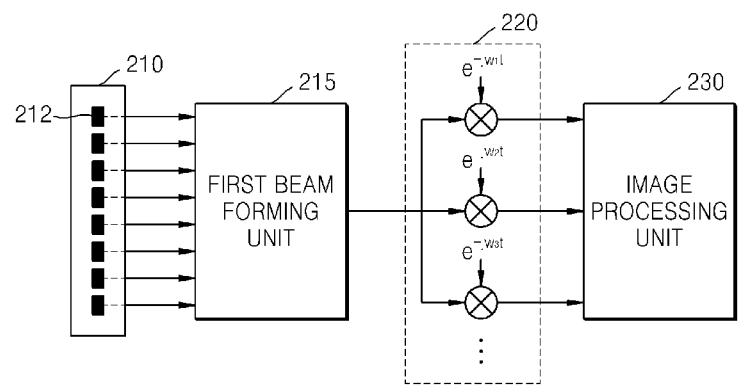
FIG. 4 is a block diagram showing the flow of a signal in the apparatus for generating a Doppler image illustrated in FIG. 3.

FIG. 4 is a block diagram showing the flow of a signal in the apparatus 200 for generating a Doppler image illustrated in FIG. 3.

A plurality of response signal are transmitted to the first beam forming unit 215 via elements 212 of the probe 210, and the first beam forming unit 215 receives and focuses the plurality of response signals to output one response signal.

The one response signal is inputted to a plurality of mixers included in the I/Q demodulation unit 220, and a plurality of I/Q signals is outputted from the plurality of mixers and is inputted to the image processing unit 230.

Referring to FIG. 4, carrier signals having different frequencies $w_1$, $w_2$, $w_3$, and . . . may be mixed with the one response signal.

Figure 5:
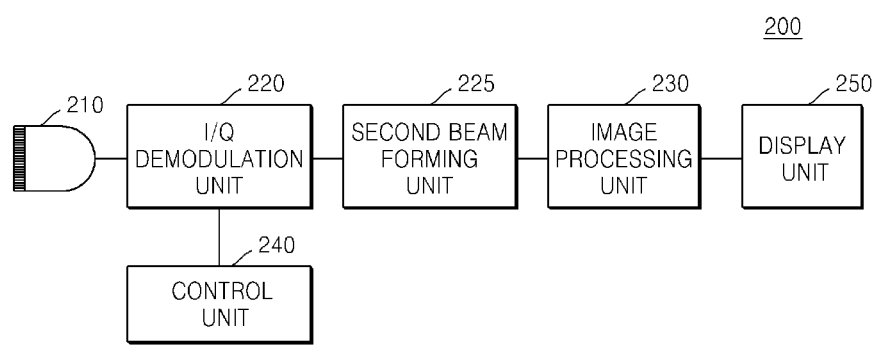
FIG. 5 is a block diagram of a structure of an apparatus for generating a Doppler image according to another embodiment of the present invention.

FIG. 5 is a block diagram of a structure of an apparatus 200 for generating a Doppler image according to another embodiment of the present invention.

Referring to FIG. 5, the apparatus 200 for generating a Doppler image according to the present embodiment may include a probe 210, an I/Q demodulation unit 220, a second beam forming unit 225, an image processing unit 230, a display unit 250 or a control unit 240.

Unlike the apparatus 200 for generating a Doppler image illustrated in FIG. 3, in the apparatus 200 for generating a Doppler image illustrated in FIG. 5, the location of the I/Q demodulation unit and the location of the beam forming unit may be reversed.

Figure 6:
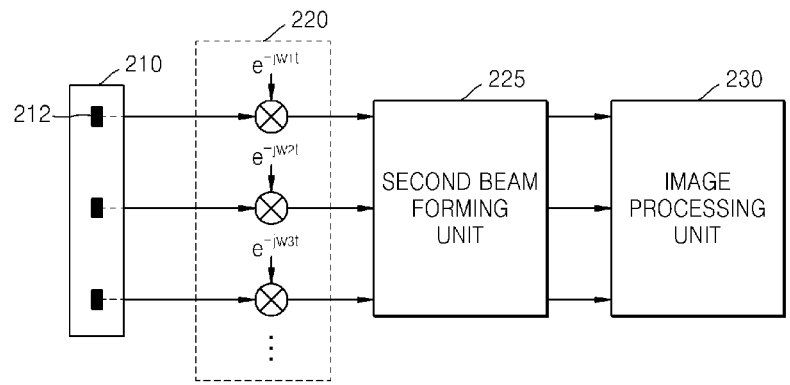
FIG. 6 is a block diagram showing the flow of a signal in the apparatus for generating a Doppler image illustrated in FIG. 5.

FIG. 6 is a block diagram showing the flow of a signal in the apparatus 200 for generating a Doppler image illustrated in FIG. 5.

Referring to FIG. 6, each of a plurality of response signals is inputted from elements 212 of the probe 210 to a plurality of mixers included in the I/Q demodulation unit 220, and the plurality of mixers outputs a plurality of I/Q signals.

The plurality of I/Q signals is inputted to the second beam forming unit 225, and the second beam forming unit 225 makes timing of the plurality of I/Q signals coincident by applying time delay to a part or the whole of the plurality of I/Q signals.

The second beam forming unit 225 illustrated in FIG. 6 does not add the plurality of I/Q signals, of which a part or the whole time delay is applied to, unlike the first beam forming unit 215 illustrated in FIG. 4, in order to improve the quality of the Doppler image generated by the image processing unit 230 by transmitting a plurality of data to the image processing unit 230.

Figure 7:
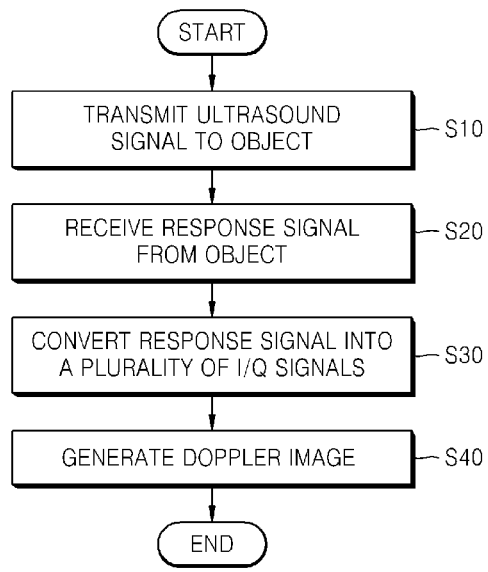
FIG. 7 is a flowchart illustrating a method for generating a Doppler image according to an embodiment of the present invention.

FIG. 7 is a flowchart illustrating a method for generating a Doppler image according to an embodiment of the present invention. Referring to FIG. 7, the method for generating a Doppler image according to the present embodiment includes operations to be performed by the apparatus 200 for generating a Doppler image illustrated in FIG. 2, 3, or 5 based on a time sequence. Thus, although omitted below, the descriptions of the apparatus 200 for generating a Doppler image illustrated in FIG. 2, 3, or 5 may apply to the method for generating a Doppler image illustrated in FIG. 7.

First, in operation S10, a ultrasound system transmits a ultrasound signal to an object.

In operation S20, the ultrasound system receives a response signal reflected from the object.

In operation S30, the ultrasound system converts the received response signal into a plurality of I/Q signals. In detail, the ultrasound signal may generate a plurality of I/Q signals by mixing a plurality of carrier signals having different frequencies with the response signal. The frequencies of the plurality of carrier signals may be set in a range of a band width of the ultrasound system based on a frequency of the ultrasound signal transmitted to the object.

In operation S40, the ultrasound system obtains information about a speed of the object based on the plurality of I/O signals and generates a Doppler image by using the information about the speed of the object. The Doppler image may include a color Doppler image or Doppler spectrum.

The embodiments of the present invention can be written as computer programs and can be implemented in general-use digital computers that execute the programs using a computer readable recording medium.

As described above, in the apparatus and method for generating a Doppler image according to the one or more embodiments of the present invention, a signal to noise ratio (SNR) of a Doppler signal may be improved using a plurality of in-phase/quadrature-phase (I/Q) signals.

In addition, in the apparatus and method for generating a Doppler image according to the one or more embodiments of the present invention, the quality of the Doppler image may be improved.

Examples of the computer readable recording medium include magnetic storage media (e.g., ROM, floppy disks, hard disks, etc.), optical recording media (e.g., CD-ROMs, or DVDs), etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for generating a Doppler image by using a ultrasound system, the method comprising:
    transmitting an ultrasound signal to an object through a probe comprising a plurality of elements including a first element and a second element;
    receiving a plurality of response signals reflected from the object, the plurality of response signals including a first response Doppler signal obtained through the first element and a second response Doppler signal obtained through the second element;
    generating a plurality of modulated Doppler signals including first and second modulated Doppler signals, wherein a first modulated Doppler signal is generated by mixing the first response Doppler signal with a first carrier signal having a first frequency and a second modulated Doppler signal is generated by mixing the second response Doppler signal with a second carrier signal having a second frequency, the second carrier signal being different from the first carrier signal;
    applying, by a beam former, time delay to the plurality of modulated Doppler signals so that timing of the first modulated Doppler signal and the second modulated Doppler signal are to be coincident;
    separately transmitting, from the beam former to an image processor, the time delayed first modulated Doppler signal corresponding to the first element and the time delayed second modulated Doppler signal corresponding to the second element, without adding the time delayed first modulated Doppler signal to the time delayed second modulated Doppler signal; and
    generating, by the image processor, a Doppler image of the object based on the time delayed plurality of modulated Doppler signal including the time delayed first modulated Doppler signal and the time delayed second modulated Doppler signal.

2. The method of claim 1, wherein the generating the plurality of modulated Doppler signals comprises:
    converting received plurality of response signals into the plurality of modulated Doppler signals.

3. The method of claim 1, wherein the generating the Doppler image comprises:
    generating the Doppler image of the object based on information about a speed of the object obtained from the time delayed plurality of modulated Doppler signals.

4. The method of claim 1, wherein the Doppler image comprises a color Doppler image or Doppler spectrum.

5. A non-transitory computer readable recording medium having recorded thereon a program for executing the method of claim 1.

6. The method of claim 1, further comprising determining the first frequency and the second frequency within a band width of the ultrasound system based on a frequency of the ultrasound signal.

7. The method of claim 1, further comprising:
    obtaining information about a speed of the object by utilizing only modulated Doppler signals that are free of error or noise, from among the plurality of modulated Doppler signals.

8. An apparatus for generating a Doppler image, comprising:
    a probe configured to transmit an ultrasound signal to an object through a plurality of elements of the probe including a first element and a second element and receive a plurality of response signals reflected from the object, the plurality of response signals including a first response Doppler signal obtained through the first element and a second response Doppler signal obtained through the second element;
    a demodulator configured to generate a plurality of modulated Doppler signals including first and second modulated Doppler signals, wherein a first modulated Doppler signal is generated by mixing the first response Doppler signal with a first carrier signal having a first frequency and a second modulated Doppler signal is generated by mixing the second response Doppler signal with a second carrier signal having a second frequency, the second carrier signal being different from the first carrier signal;
    a beam former configured to apply time delay to the plurality of modulated Doppler signals so that timing of the first modulated Doppler signal and the second modulated Doppler signal are to be coincident; and
    an image processor configured to generate a Doppler image of the object based on the time delayed plurality of modulated Doppler signal including the time delayed first modulated Doppler signal and the time delayed second modulated Doppler signal,
    wherein the time delayed first modulated Doppler signal corresponding to the first element and the time delayed second modulated Doppler signal corresponding to the second element are separately transmitted from the beam former to the image processor, without adding the time delayed first modulated Doppler signal to the time delayed second modulated Doppler signal.

9. The apparatus of claim 8, wherein the demodulator is configured to convert received plurality of response signals into the plurality of modulated Doppler signals.

10. The apparatus of claim 8,
wherein the image processor is configured to generate the Doppler image of the object based on information about a speed of the object obtained from the time delayed plurality of modulated Doppler signals.

11. The apparatus of claim 8, wherein the Doppler image comprises a color Doppler image or Doppler spectrum.

12. The apparatus of claim 8, further comprising a control unit configured to determine the first frequency and the second frequency within a band width of the ultrasound system based on a frequency of the ultrasound signal.

13. The apparatus of claim 8, wherein the image processor is further configured to obtain information about a speed of the object by utilizing only modulated Doppler signals that are free of error or noise, from among the plurality of modulated Doppler.

* * * * *